US008390243B2

United States Patent
Wu et al.

(10) Patent No.: US 8,390,243 B2
(45) Date of Patent: Mar. 5, 2013

(54) CHARGE-CONTROLLING SYSTEM AND METHOD THEREFOR

(75) Inventors: Yueh-Lin Wu, Kwei Shan Township, Taoyuan County (TW); Yu-Ming Sun, Kwei Shan Township, Taoyuan County (TW); Chi-Bin Wu, Kwei Shan Township, Taoyuan County (TW)

(73) Assignee: Chung-Hsin Electric and Machinery Manufacturing Corp, Jhonghe, Taipei County (TW)

( * ) Notice: Subject to any disclaimer, the term of this patent is extended or adjusted under 35 U.S.C. 154(b) by 295 days.

(21) Appl. No.: 12/965,971

(22) Filed: Dec. 13, 2010

(65) Prior Publication Data

US 2012/0104989 A1  May 3, 2012

(30) Foreign Application Priority Data

Nov. 1, 2010 (TW) .............................. 99137392 A

(51) Int. Cl.
*H02J 7/00* (2006.01)
(52) U.S. Cl. ........................................................ 320/101
(58) Field of Classification Search .................. 320/101
See application file for complete search history.

(56) References Cited

U.S. PATENT DOCUMENTS

| 6,369,461 | B1 * | 4/2002 | Jungreis et al. | 307/46 |
| 7,692,330 | B2 * | 4/2010 | Takada et al. | 307/45 |
| 8,159,178 | B2 * | 4/2012 | Serban | 320/101 |
| 8,237,312 | B2 * | 8/2012 | Schrieber et al. | 307/134 |
| 2007/0009770 | A1 * | 1/2007 | Takada et al. | 429/9 |

* cited by examiner

*Primary Examiner* — Ramy Ramadan
(74) *Attorney, Agent, or Firm* — Stites & Harbison, PLLC; Juan Carlos A. Marquez, Esq.

(57) ABSTRACT

A charge-controlling system and a method therefor are applicable to a backup power system having a fuel-cell-based power supply and a battery. The charge-controlling system includes a bidirectional converter, a feedback circuit, a voltage controller, a PWM generator, a switch unit and an over-charging protection circuit. The feedback circuit generates a feedback signal corresponding to an output voltage of the bidirectional converter. The voltage controller generates a control voltage according to the feedback signal and a constant voltage, such that the PWM generator generates a PWM signal based on the control voltage. The over-charging protection circuit controls operation of the switch unit according to the feedback signal and a saturation voltage of the battery. When the switch unit electrically connects the bidirectional converter and the PWM generator, the bidirectional converter charges the battery with the power generated by the fuel-cell-based power supply according to the PWM signal.

10 Claims, 7 Drawing Sheets

CHARGE-CONTROLLING SYSTEM AND METHOD THEREFOR

BACKGROUND OF THE INVENTION

1. Technical Field

The present invention relates to a charge-controlling system and a method therefor. More particularly, the present invention relates to a charge-controlling system and a charge-controlling method applicable to a backup power system.

2. Description of Related Art

A fuel cell is a cell that converts chemical energy into an electric output by means of an electrochemical reaction, and it works on the principle that a fuel containing hydrogen and an oxidant (air or oxygen) are delivered to an anode and a cathode of the fuel cell, wherein the fuel is decomposed into hydrogen ions and electrons at the anode, and the hydrogen ions are transferred to the cathode from the anode through a proton exchange membrane to be react with electrons delivered to the cathode by an external circuit so as to generate water. By consistently providing the fuel, the fuel cell is enabled to continuously generate electric power. Since the reaction product of the fuel cell is water, it brings no pollution to the environment. As being highly effective and free from pollution, this technology has long been extensively followed with interest since its launch.

Power supplying of such a fuel cell is dependent on fuel concentration, reaction temperature, fuel delivery and movement of electron currents, so a fuel cell's output voltage and current are highly subject to its load device. When the dynamic load device requires power of high current at a transient time, it is necessary to reduce the reaction voltage of the fuel cell immediately, so as to provide the current required by the load. However, due to the reaction mechanism of the fuel cell, it is not easy to provide the load with transient high-power electric energy. In addition, in the course of repeated power generation, the fuel cell tends to have the generated power transiently unstable because of the concentration decay of the fuel.

Traditionally, in order to prevent transient high-power demand caused by load variation or to prevent unstable power generated by the reaction of the fuel cell, a capacitor or a secondary cell set may be used with the fuel cell. Therein, the secondary cell set maybe charged by constant-voltage charging or constant-current charging.

When charged by constant-voltage charging, the secondary cell set, at the initial stage of charging, has its voltage relatively low, so the excessively large charging current can heat and in turn damage the secondary cell set.

When charged by constant-current charging, the secondary cell set is free from the excessively large charging current at the initial stage of charging because the charging current does not vary with the increasing voltage of the secondary cell set. However, at the late stage of charging, the charging voltage is likely to go beyond the limitation of the secondary cell set and thus damage the secondary cell set. Furthermore, since the charging current is always constant, a relatively long charging time would be required.

SUMMARY OF THE INVENTION

The present invention is directed to a charge-controlling system and a method therefor, which take an actual feedback signal plus a constant voltage as a reference voltage for controlling a bidirectional converter, so as to maintain a voltage difference between output voltages of the bidirectional converter and a regulated battery small, thereby lowering an initial charging current and in turn preventing a starting current (i.e. the charging current at the initial stage of charging) from being excessively large.

The present invention is also directed to a charge-controlling system and a method therefor, which control a switch unit to cut off an output of a PWM (pulse width modulation) generator when a charging voltage is greater than a saturation voltage of a regulated battery, so as to make a bidirectional converter stop charging the regulated battery, thereby preventing voltage overcharge at the late stage of charging.

To achieve the above effects, the present invention provides a charge-controlling system applicable to a backup power system. The backup power system comprises a fuel-cell-based power supply and a regulated battery. The regulated battery serves to stabilize a power output of the backup power system. The charge-controlling system comprises: a bidirectional converter electrically connected between the fuel-cell-based power supply and the regulated battery; a feedback circuit configured to generate a feedback signal corresponding to an output voltage of the bidirectional converter; a voltage controller electrically connected to the feedback circuit so as to generate a control voltage according to the feedback signal and a constant voltage; a PWM generator electrically connected to the voltage controller so as to generate a PWM signal according to the control voltage; a switch unit electrically connected between the bidirectional converter and the PWM generator, wherein when the switch unit turns on the bidirectional converter and the PWM generator, the bidirectional converter charges the regulated battery with power generated by the fuel-cell-based power supply according to the PWM signal; and an over-charging protection circuit electrically connected between the feedback circuit and the switch unit so as to control the switch unit according to feedback signal and a saturation voltage of the regulated battery.

The present invention also provides a charge-controlling method applicable to a backup power system. The backup power system comprises a fuel-cell-based power supply and a regulated battery serving to stabilize a power output of the backup power system. Herein, the charge-controlling method comprises the steps of: making a bidirectional converter charge the regulated battery with power generated by the fuel-cell-based power supply in a duty cycle corresponding to a PWM signal; generating a feedback signal according to an output voltage of the bidirectional converter; generating the PWM signal according to the feedback signal and a constant voltage; and controlling a switch unit according to the feedback signal and a saturation voltage of the regulated battery so as to determine whether to establish or break an electric connection between the PWM signal and the bidirectional converter or not.

By implementing the present invention, at least the following progressive effects can be achieved:

1. By taking the actual feedback signal output by the bidirectional converter plus the constant voltage that is relatively small as the reference voltage for controlling the bidirectional converter to operate, the initial charging current can be reduced so as to prevent the starting current being excessively large.

2. By controlling the switch unit to cut off the output of the PWM generator when the charging voltage is greater than the saturation voltage of the regulated battery, the bidirectional converter is stopped charging the regulated battery, thereby preventing voltage overcharge at the late stage of charging.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
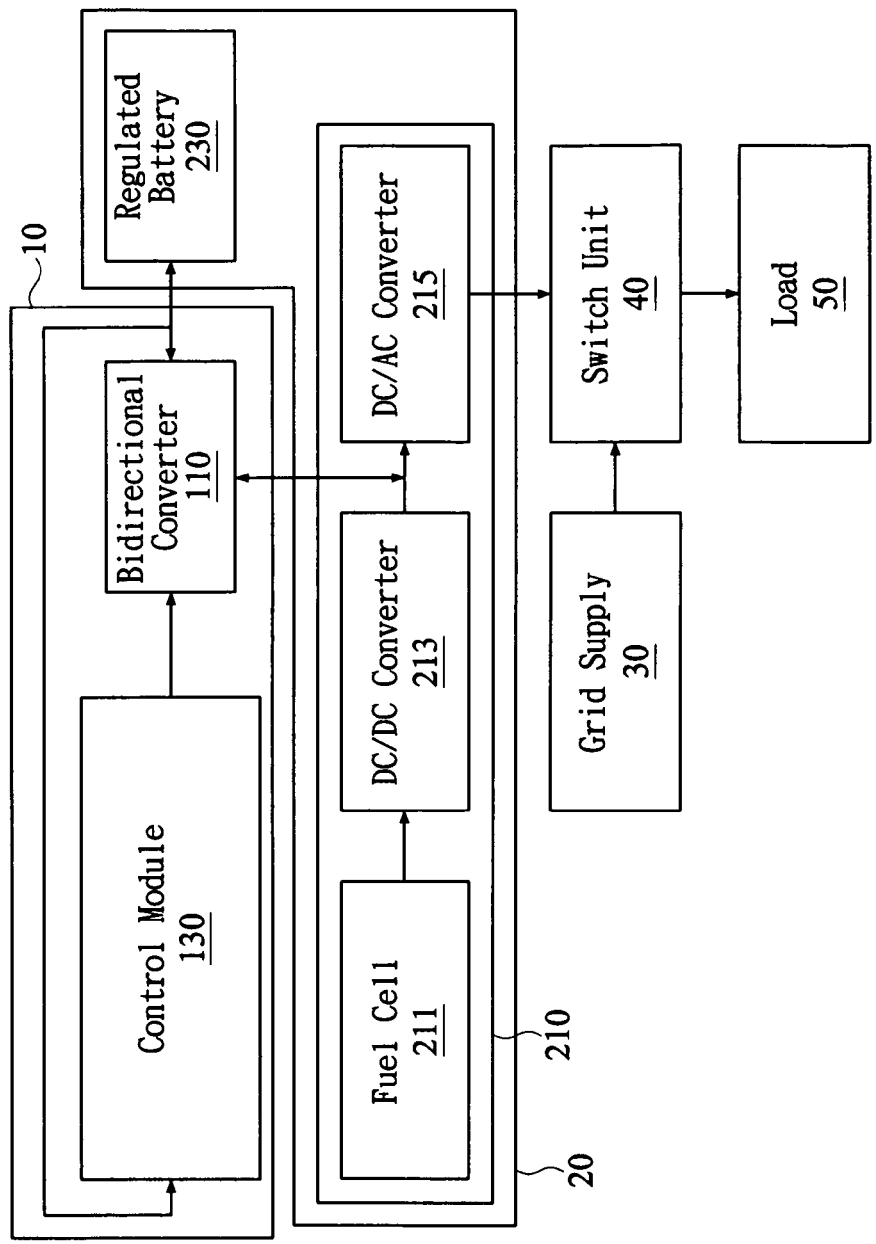
FIG. 1 is a schematic application layout of a charge-controlling system according to one embodiment of the present invention.

Referring to FIG. 1, a charge-controlling system 10 applicable to a backup power system 20 is disclosed. The backup power system 20 and a grid supply 30 are connected with a load 50 through a switch unit 40. In other words, by switching the switch unit 40, AC power output by the backup power system 20 and/or power supplied by the grid supply 30 can be provided to the load 50.

The backup power system 20 comprises a fuel-cell-based power supply 210 and a regulated battery 230. The fuel-cell-based power supply 210 comprises a fuel cell 211, a DC/DC converter 213 and a DC/AC converter 215.

The fuel cell 211 has an output end electrically connected to an input end of the DC/DC converter 213, and the DC/DC converter 213 has its output end electrically connected to an input end of the DC/AC converter 215, while the DC/AC converter 215 has its output end connected to the load 50 via the switch unit 40.

The charge-controlling system 10 comprises a bidirectional converter 110 and a control module 130.

The bidirectional converter 110 is electrically connected between the fuel-cell-based power supply 210 and the regulated battery 230. Herein, the regulated battery 230 may be electrically connected between the output end of the DC/DC converter 213 of the fuel-cell-based power supply 210 and the input end of the DC/AC converter 215 by means of the bidirectional converter 110.

The bidirectional converter 110 serves to use surplus power generated by the DC/DC converter 213 to charge the regulated battery 230. In addition, the bidirectional converter 110 also serves to make the power stored in the regulated battery 230 output to the DC/AC converter 215, so as to complement the fuel cell 211 as well as make up the power shortage at the load 50.

In other words, the regulated battery 230 serves to stabilize the power output of the backup power system 20. Upon starting the fuel cell 211 or adding the load 50, the fuel cell 211 needs a lead time for reaction and generation of corresponding power, and the regulated battery 230 can, at this time, provide power to the load 50, thereby stabilizing the power output of the backup power system 20.

In the course of charging the regulated battery 230, the control module 130 serves to control the bidirectional converter 110, so as to use the power generated by the fuel-cell-based power supply 210 to charge the regulated battery 230. Therein, the control module 130 may be realized through a digital signal processor.

Figure 2:
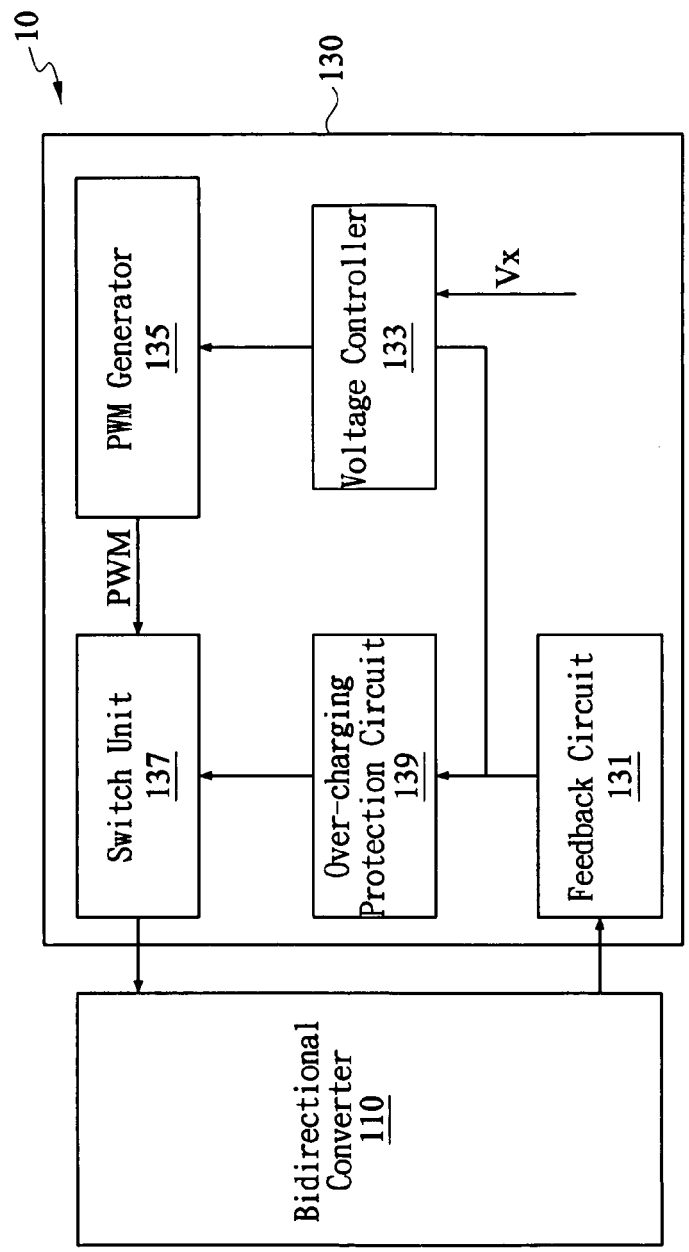
FIG. 2 is a schematic structural diagram of the charge-controlling system according to a first embodiment of the present invention.

Referring to FIG. 2, the control module 130 includes a feedback circuit 131, a voltage controller 133, a PWM (pulse width modulation) generator 135, a switch unit 137 and an over-charging protection circuit 139.

The feedback circuit 131 is electrically connected between an output end of the bidirectional converter 110 and an input end of the voltage controller 133. The voltage controller 133 has its output end electrically connected to an input end of the PWM generator 135. The switch unit 137 is electrically connected between the bidirectional converter 110 and the output ends of the PWM generator 135, and the over-charging protection circuit 139 is electrically connected between the feedback circuit 131 and the switch unit 137.

Please refer to FIG. 1 and FIG. 2 at the same time. The feedback circuit 131 acquires an output of the bidirectional converter 110 to the regulated battery 230, so as to generate a feedback signal corresponding to an output voltage of the bidirectional converter 110. Then, the voltage controller 133 generates a control voltage according to the feedback signal and a constant voltage Vx, and the PWM generator 135 generates a PWM signal PWM according to the control voltage.

The over-charging protection circuit 139 controls the switch unit 137 according to the feedback signal and a saturation voltage of the regulated battery 230. When the switch unit 137 turns on the bidirectional converter 110 and the PWM generator 135, the bidirectional converter 110, according to the PWM signal PWM generated by the PWM generator 135, charges the regulated battery 230 with the DC current generated by the fuel-cell-based power supply 210.

In other words, in the course of charging the regulated battery 230, the output voltage of the bidirectional converter 110 equivalently increases by the amount of a voltage difference of the constant voltage Vx in response to each feedback control. When detecting, through the feedback signal, that the output voltage of the bidirectional converter 110 is greater than the saturation voltage of the regulated battery 230, the over-charging protection circuit 139 controls the switch unit 137 to break the electric connection between the bidirectional converter 110 and the PWM generator 135. At this time, the control signal received by the bidirectional converter 110 turns to zero from the PWM signal PWM generated by the PWM generator 135, so the charging to the regulated battery 230 is stopped.

When receiving the PWM signal PWM generated by the PWM generator 135, the bidirectional converter 110 charges the regulated battery 230 with the DC current generated by the fuel-cell-based power supply 210 in a duty cycle corresponding to the PWM signal PWM. When the signal received by the bidirectional converter 110 turns to zero from the PWM signal PWM, the bidirectional converter 110 has its duty cycle respond to the received signal of zero, and stops charging the regulated battery 230. Thereby, voltage overcharge at the late stage of charging can be eliminated. Herein, the constant voltage Vx is a relatively small voltage. Preferably, the constant voltage Vx is equal to one tenth of the initial charging voltage of the bidirectional converter 110.

Stating differently, a reference voltage taken by the control module 130 to control the bidirectional converter 110 is the actual feedback signal corresponding to the output voltage (charging voltage) of the bidirectional converter 110 plus a relatively small constant voltage Vx. Thereby, the initial charging current can be reduced, and the starting current is prevented from being excessively large.

Figure 3:
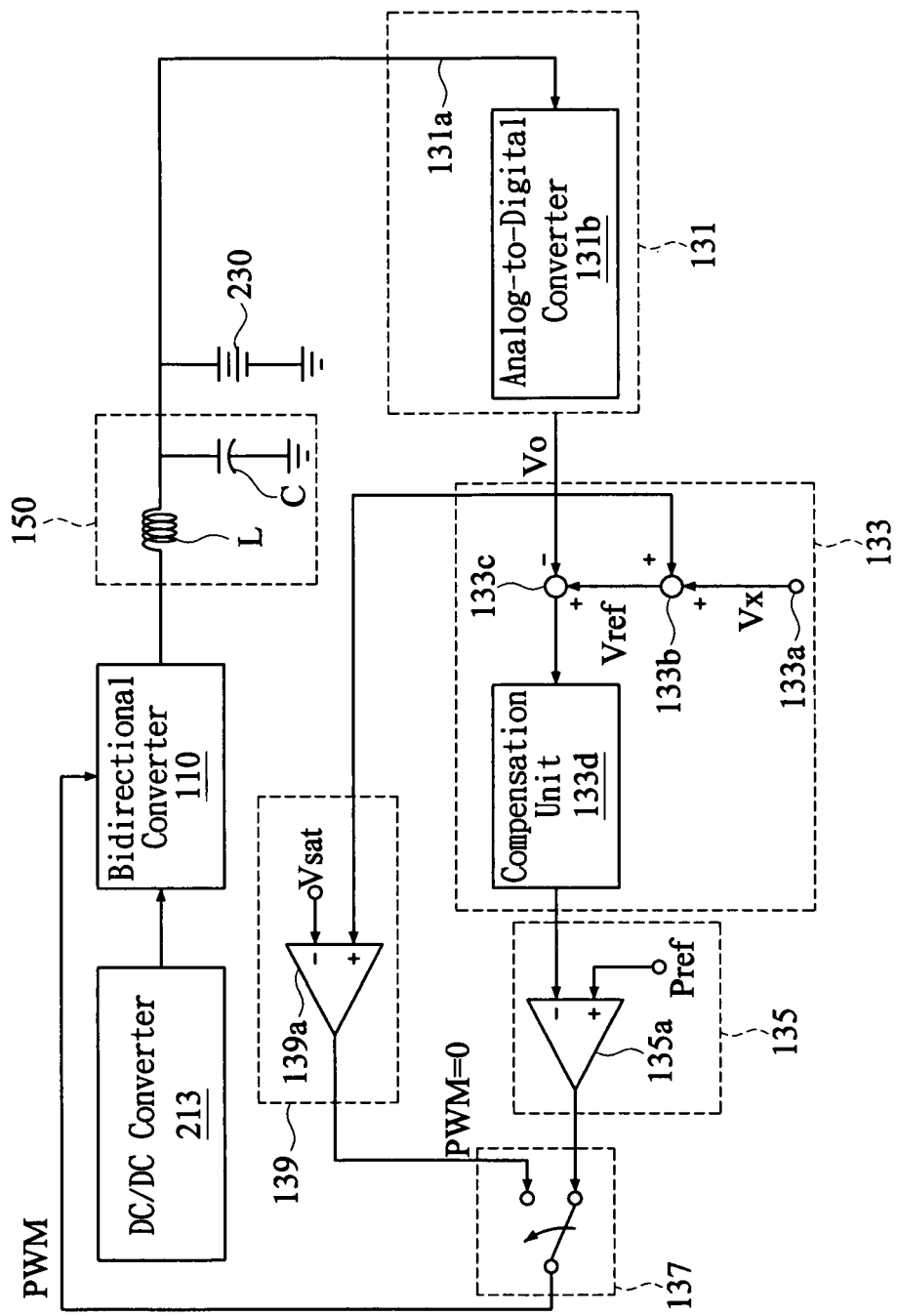
FIG. 3 is a schematic structural diagram of the charge-controlling system according to a second embodiment of the present invention.

Referring to FIG. 3, the feedback circuit 131 may comprise a feedback circuit 131a and an analog-to-digital converter 131b. The feedback circuit 131a serves to electrically connect the output of the bidirectional converter 110 to the analog-to-digital converter 131b.

The analog-to-digital converter 131b then converts the feedback signal transmitted from the feedback circuit 131a to the corresponding output voltage of the bidirectional converter 110 into a digital form from an analog form, and provides the digital feedback signal Vo to the voltage controller 133.

Moreover, the feedback circuit 131a may include a voltage-dividing resistor (not shown) for decaying the output voltage of the bidirectional converter 110 to a voltage limitation of the analog-to-digital converter 13 lb. Afterward, the analog-to-digital converter 131b converts the decayed output voltage of the bidirectional converter 110 into a digital form from an analog form, so as to generate the digital feedback signal Vo.

Referring to FIGS. 2 and 3, the voltage controller 133 may include a voltage input end 133a, an adder 133b, a subtractor 133c and a compensation unit 133d.

The voltage input end 133a is electrically connected to a constant-voltage supply end. The adder 133b has its two input ends electrically connected to the voltage input end 133a and the analog-to-digital converter 131b, respectively. The subtractor 133c has its positive input end electrically connected an output end of the adder 133b and has its negative input end electrically connected to the analog-to-digital converter 133b. The compensation unit 133d is electrically connected between an output end of the subtractor 133c and the PWM generator 135.

The voltage input end 133a receives the constant voltage Vx from the constant-voltage supply end. The adder 133b receives the digital feedback signal Vo output by the analog-to-digital converter 131b and the constant voltage Vx coming from the voltage input end 133a, and sum the received feedback signal Vo and the constant voltage Vx so as to generate the reference voltage Vref. The subtractor 133c subtracts an output of the adder 133b (i.e. the reference voltage Vref) from the feedback signal Vo. The compensation unit 133d generates the control voltage according to an output of the subtractor 133c.

The output of the subtractor 133c corresponds to a voltage difference between two said control voltages successively generated by the compensation unit 133d. In other words, the voltage difference between the two control voltages successively generated by the compensation unit 133d is corresponding to the constant voltage Vx. Therefore, the PWM signal PWM generated according to the control voltage varies with the control voltage, so that the output voltage of the bidirectional converter 110, answering to each feedback control, increases equally by the voltage difference of the constant voltage Vx.

The PWM generator 135 may include a comparator 135a. The comparator 135a has its negative input end electrically connected to the compensation unit 133d of the voltage controller 133, and has its positive input end electrically connected to a reference-pulse supply end, while having its output end electrically connected to the switch unit 137.

The negative input end of the comparator 135a receives the control voltage output by the compensation unit 133d of the voltage controller 133, and the positive input end of the comparator 135a receives a reference pulse Pref coming from the reference-pulse supply end. Herein, the reference pulse Pref may be realized by a triangle-wave signal.

The comparator 135a then compares the received control voltage and reference pulse Pref, and generates the PWM signal PWM according to the comparison between the control voltage and the reference pulse Pref.

The over-charging protection circuit 139 may include a comparator 139a. The comparator 139a has its positive input end electrically connected to the analog-to-digital converter 131b of the feedback circuit 131, and has its negative input end electrically connected to a threshold-signal supply end, while having its output end electrically connected to a control end of the switch unit 137.

The switch unit 137 has its two input ends electrically connected to an output end and an off end of the comparator 135a (i.e. the PWM signal PWM is 0), respectively, while having its output end electrically connected to a control end of the bidirectional converter 110.

The positive input end of the comparator 139a receives the digital feedback signal Vo output by the analog-to-digital converter 131b, and the negative input end of the comparator 139a receives a threshold signal Vsat provided by the threshold-signal supply end. Herein, the threshold signal Vsat corresponds to the saturation voltage of the regulated battery 230.

The comparator 139a compares the received feedback signal Vo and threshold signal Vsat, and controls the switch unit 137 according to the comparison between the feedback signal Vo and threshold signal Vsat.

Normally, the switch unit 137 electrically connects the output end of the comparator 135a to the control end of the bidirectional converter 110, so as to make the bidirectional converter 110 provide the output voltage to the regulated battery 230 in a duty cycle corresponding to the PWM signal PWM. That is, the DC current generated by the fuel-cell-based power supply 210 charges the regulated battery 230 in the duty cycle corresponding to the PWM signal PWM. When the comparator 139a through the comparison detects that the feedback signal Vo is greater than the threshold signal Vsat, the comparator 139a makes the switch unit 137 break off the electric connection between the comparator 135a and the bidirectional converter 110. At this time, the PWM signal PWM output from the switch unit 137 is zero, so the bidirectional converter 110 stops charging the regulated battery 230.

Figure 4:
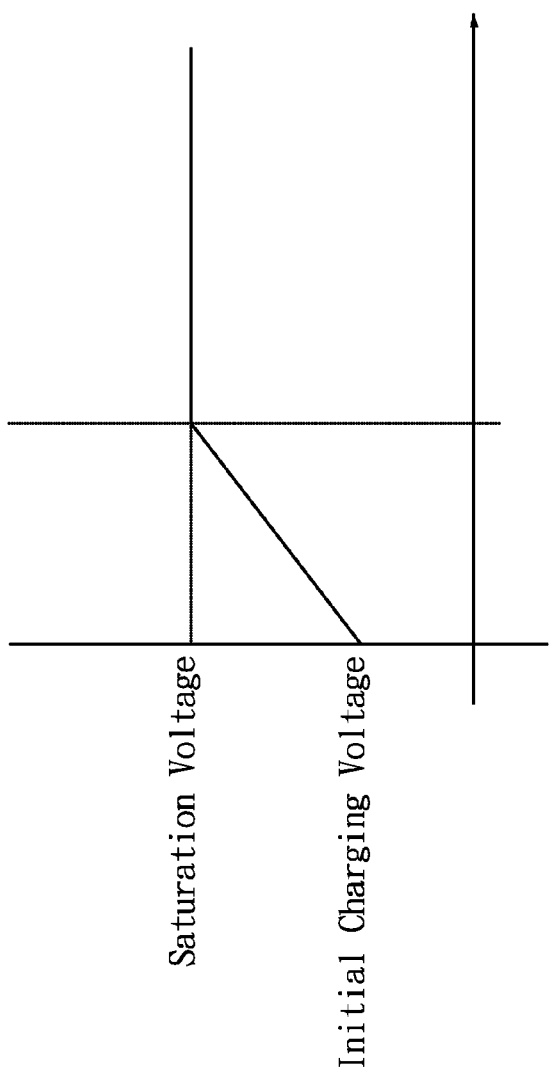
FIG. 4 shows, in the charge-controlling system of the present invention, the voltage variation of a reference voltage and a voltage of the regulated battery.

In the course of charging the regulated battery 230, the voltage variation of the reference voltage Vref and the regulated battery 230 is shown in FIG. 4.

Additionally, a filtering circuit 150 may be connected in series to the output end of the bidirectional converter 110, for filtering the output of the bidirectional converter 110. The filtering circuit 150 may be an LC filter composed of an inductor L and a capacitor C.

Figure 5:
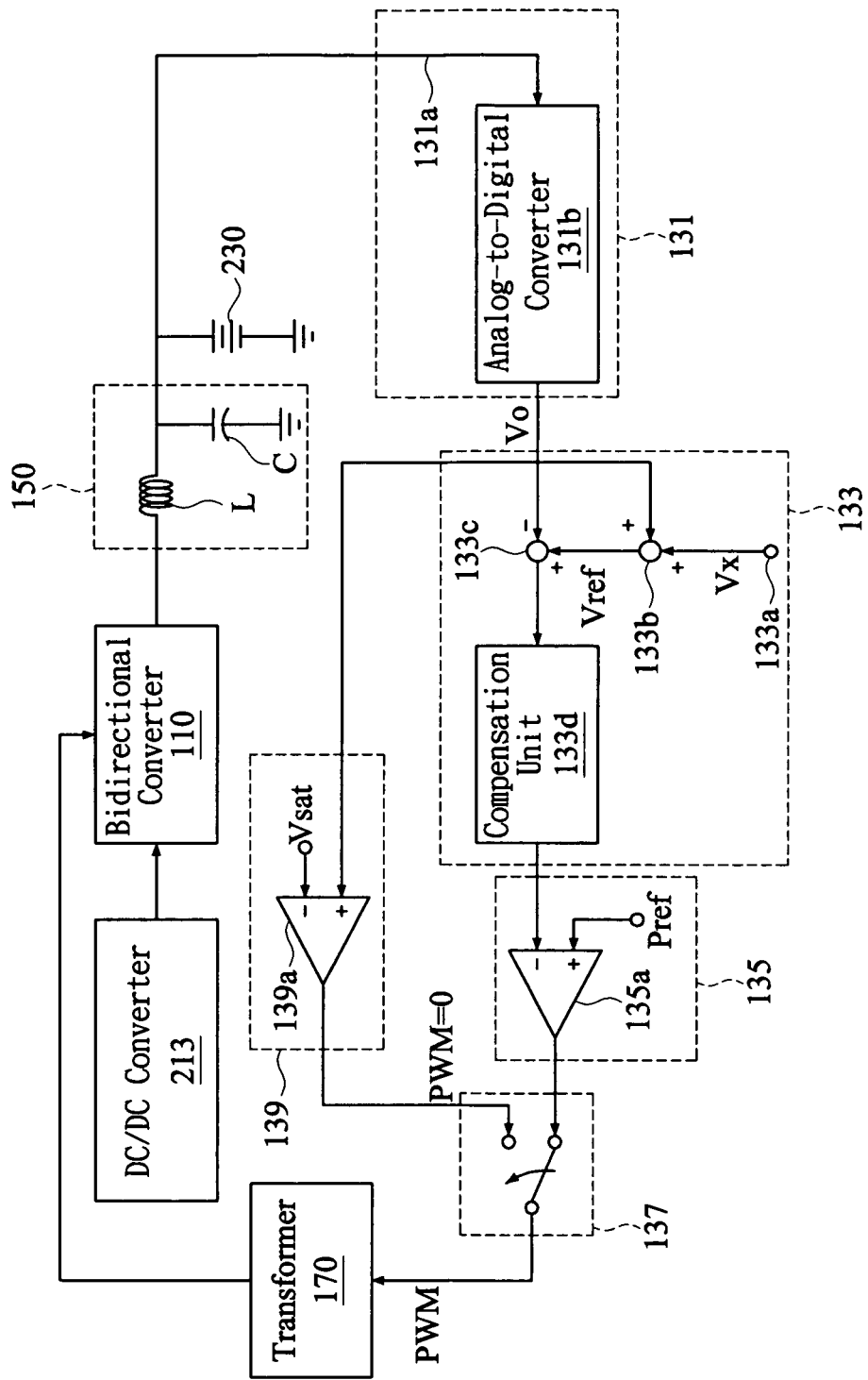
FIG. 5 is a schematic structural diagram of the charge-controlling system according to a third embodiment of the present invention.

Moreover, referring to FIG. 5, when the bidirectional converter 110 is an isolated one, a transformer 170 may be provided between the output end of the switch unit 137 and the control end of the bidirectional converter 110, for isolating different grounding architectures.

Furthermore, according to the above architecture, the present invention also provides a charge-controlling method.

Figure 6:
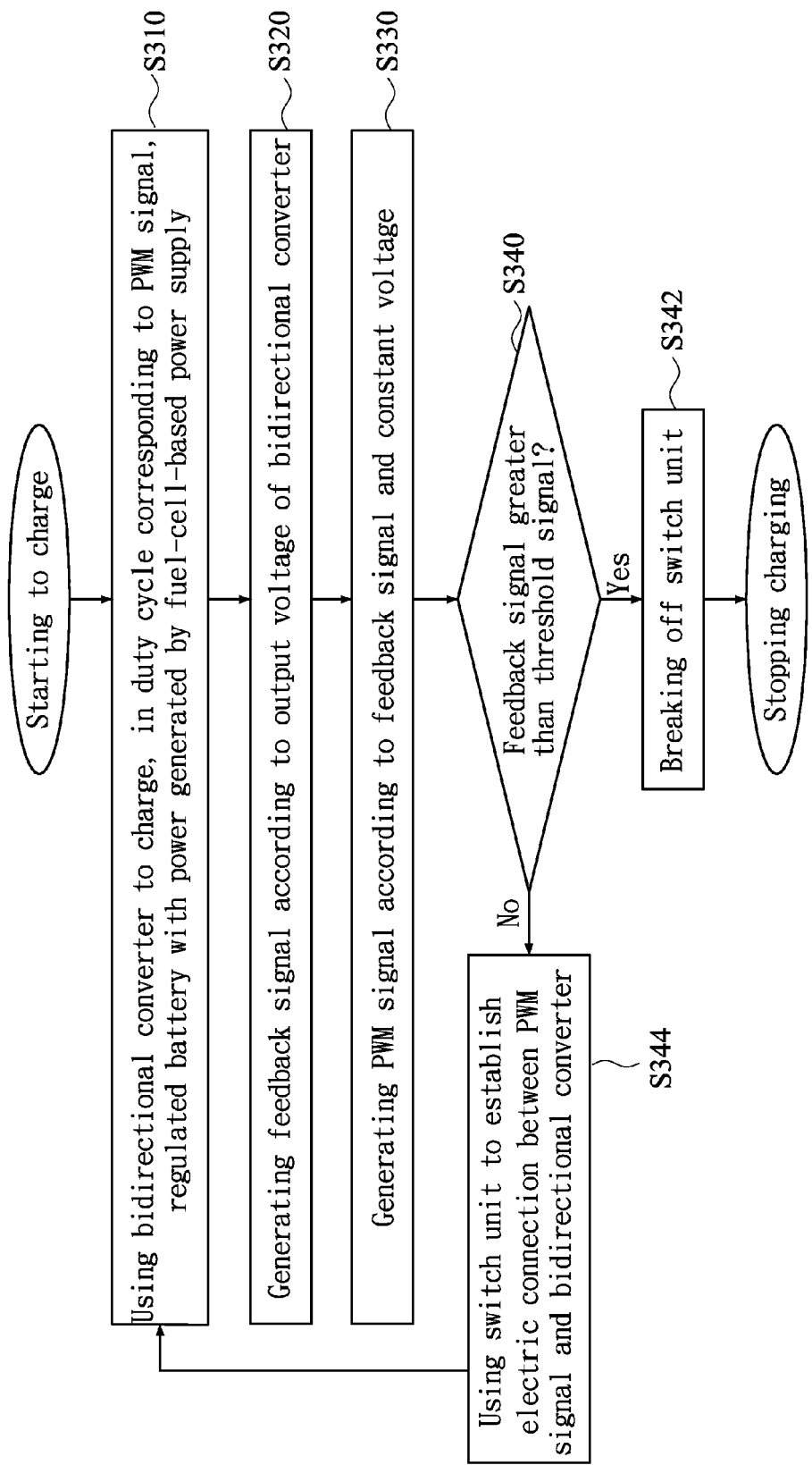
FIG. 6 is a flowchart of a charge-controlling method according to one embodiment of the present invention.
Figure 7:
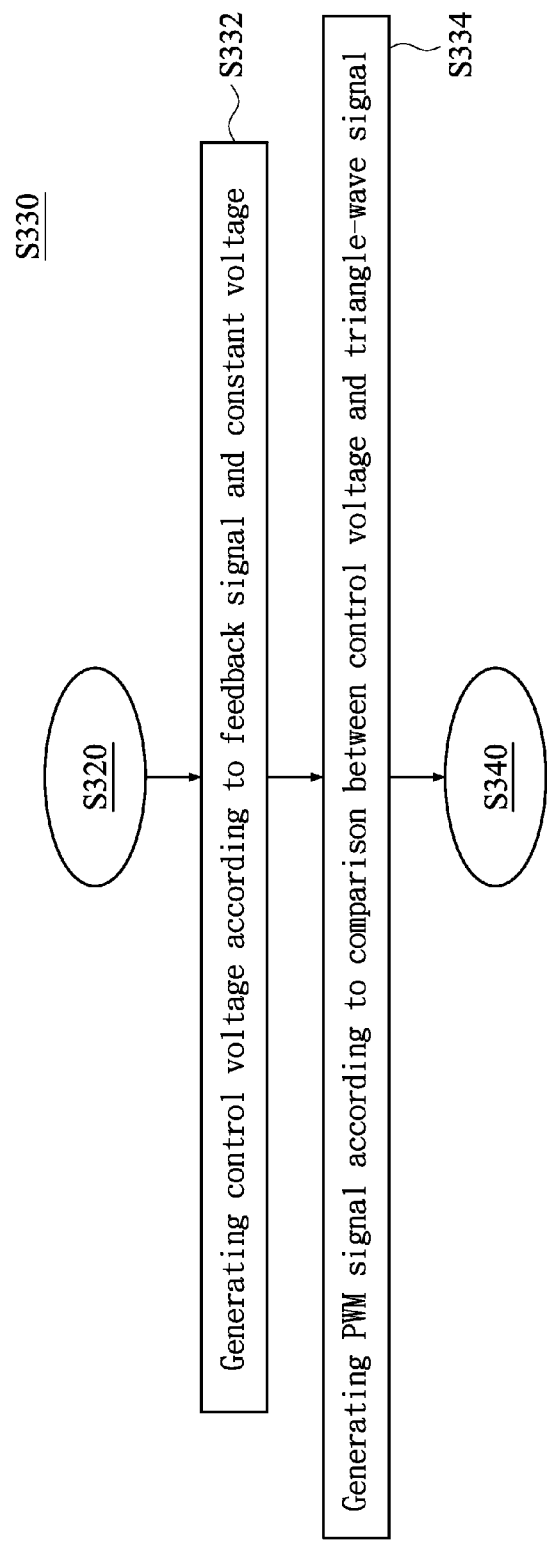
FIG. 7 is a flowchart of a step 5330 in the charge-controlling method.

FIG. 6 is a flowchart of the charge-controlling method according to one embodiment of the present invention and FIG. 7 is a flowchart of a step S330 of the embodiment.

Referring to FIGS. 1, 2 and 6, the charge-controlling method is applicable to a backup power system 20. The backup power system 20 comprises a fuel-cell-based power supply 210 and a regulated battery 230. The regulated battery 230 serves to stabilize power output of the backup power system 20. Upon starting the fuel-cell-based power supply 210 or adding a load 50, a fuel cell 211 in the fuel-cell-based power supply 210 needs a lead time for reaction and generation of corresponding power, and the regulated battery 230 can, at this time, provide power to the load 50, thereby stabilizing the power output of the backup power system 20.

The charge-controlling method comprises the following steps: using a bidirectional converter 110 to charge, in a duty cycle corresponding to a PWM signal PWM, the regulated battery 230 with power generated by the fuel-cell-based power supply 210 (S310); generating a feedback signal Vo according to an output voltage of the bidirectional converter 110 (S320); generating the PWM signal PWM according to the feedback signal Vo and a constant voltage Vx (S330); and controlling a switch unit 137 according to the feedback signal Vo and a saturation voltage of the regulated battery 230, so as to establish or break an electric connection between the PWM signal PWM and the bidirectional converter 110 (S340), (S342), (S344).

The step of controlling the switch unit according to the feedback signal and the saturation voltage of the regulated battery comprises the following steps: comparing the feedback signal Vo with a threshold signal Vsat (S340); when the feedback signal Vo is greater than the threshold signal Vsat, breaking off the switch unit 137 so as to break the electric connection between the PWM signal PWM and the bidirectional converter 110 (S342); and when the feedback signal Vo is not greater than the threshold signal Vsat, using the switch unit 137 to establish the electric connection between the PWM signal PWM and the bidirectional converter 110 (S344). Herein, the threshold signal Vsat corresponds to the saturation voltage of the regulated battery 230.

Referring to FIG. 7, the step S330 may comprise generating a control voltage according to the feedback signal and the constant voltage (S332), and generating the PWM signal according to a comparison between the control voltage and a triangle-wave signal (S334). Therein, the constant voltage corresponds to a voltage difference between two control voltages generated successively by the compensation unit.

To sum up, by implementing the present invention, the actual feedback signal corresponding to the output of the bidirectional converter plus a relatively small constant voltage can be used as the reference voltage for the control of the bidirectional converter, so as to reduce the initial charging current, and thereby prevent excessively large starting current. In addition, when the charging voltage is greater than the saturation voltage of the regulated battery, the switch unit can be controlled to break off the output of the PWM generator, so as to make the bidirectional converter stop charging the regulated battery, and thereby prevent voltage overcharge at the late stage of charging.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A charge-controlling system applicable to a backup power system, the backup power system having a fuel-cell-based power supply and a regulated battery that serves to stabilize a power output of the backup power system, and the charge-controlling system comprising:
   a bidirectional converter electrically connected between the fuel-cell-based power supply and the regulated battery;
   a feedback circuit configured to generate a feedback signal corresponding to an output voltage of the bidirectional converter;
   a voltage controller electrically connected to the feedback circuit and configured to generate a control voltage according to the feedback signal and a constant voltage;
   a pulse-width-modulation generator electrically connected the voltage controller and configured to generate a PWM signal according to the control voltage;
   a switch unit electrically connected between the bidirectional converter and the pulse-width-modulation generator, wherein when the switch unit turns on the bidirectional converter and the pulse-width-modulation generator, the bidirectional converter, according to the PWM signal, charges the regulated battery with power generated by the fuel-cell-based power supply; and
   an over-charging protection circuit electrically connected between the feedback circuit and the switch unit and configured to control the switch unit according to the feedback signal and a saturation voltage of the regulated battery.

2. The charge-controlling system of claim 1, wherein the voltage controller comprises:
   a voltage input end configured to receive the constant voltage;
   an adder having two input ends electrically connected to the voltage input end and the feedback circuit, so as to add the feedback signal and the constant voltage altogether;
   a subtractor having two input ends electrically connected to an output end of the adder and the feedback circuit, so as to subtract the feedback signal from an output of the adder; and
   a compensation unit electrically connected between an output end of the subtractor and the pulse-width-modulation generator, and configured to generate the control voltage according to an output of the subtractor, wherein the output of the subtractor corresponds to a voltage difference between two said control voltages generated by the compensation unit successively.

3. The charge-controlling system of claim 1, wherein the pulse-width-modulation generator comprises:
   a comparator having an input end electrically connected to the voltage controller and an output end electrically connected to the switch unit, and being configured to generate the PWM signal according to a comparison between the control voltage and a triangle-wave signal.

4. The charge-controlling system of claim 1, wherein the over-charging protection circuit comprises:
   a comparator having an input end electrically connected to the feedback circuit and an output end electrically connected to a control end of the switch unit, and being configured to control the switch unit according to a comparison between the feedback signal and a threshold signal, wherein the threshold signal corresponds to the saturation voltage of the regulated battery, and when the feedback signal is greater than the threshold signal, the comparator makes the switch unit off.

5. The charge-controlling system of claim 1, wherein the feedback circuit comprises:
   an analog-to-digital converter having an input end electrically connected to the bidirectional converter and an output end electrically connected to the voltage controller and the over-charging protection circuit, and being configured to convert the decayed output voltage of the bidirectional converter into a digital form from an analog form so as to generate the feedback signal.

6. The charge-controlling system of claim 1, further comprising:
a filtering circuit electrically connected in series to an output of the bidirectional converter.

7. The charge-controlling system of claim 1, wherein the bidirectional converter has a duty cycle corresponding to the PWM signal.

8. A charge-controlling method applicable to a backup power system, the backup power system having a fuel-cell-based power supply and a regulated battery that serves to stabilize a power output of the backup power system, and the charge-controlling method comprising the steps of:
using a bidirectional converter to charge, in a duty cycle corresponding to a PWM signal, the regulated battery with power generated by the fuel-cell-based power supply;
generating a feedback signal according to an output voltage of the bidirectional converter;
generating the PWM signal according to the feedback signal and a constant voltage; and
controlling a switch unit according to the feedback signal and a saturation voltage of the regulated battery, so as to establish or break an electric connection between the PWM signal and the bidirectional converter.

9. The charge-controlling method of claim 8, wherein the step of generating the PWM signal according to the feedback signal and the constant voltage comprises the steps of:
generating a control voltage according to the feedback signal and the constant voltage, wherein the constant voltage corresponds to a voltage difference between two said control voltages generated by the compensation unit successively; and
generating the PWM signal according to a comparison between the control voltage and a triangle-wave signal.

10. The charge-controlling method of claim 8, wherein the step of controlling the switch unit according to the feedback signal and the saturation voltage of the regulated battery comprises the steps of:
comparing the feedback signal with a threshold signal, wherein the threshold signal corresponds to the saturation voltage of the regulated battery;
when the feedback signal is greater than the threshold signal, breaking off the switch unit, so as to break an electric connection between the PWM signal and the bidirectional converter; and
when the feedback signal is not greater than the threshold signal, using the switch unit to establish the electric connection between the PWM signal and the bidirectional converter.

* * * * *